April 1, 1958     R. J. COAR     2,828,606
AFTERBURNER FUEL METERING DEVICE FOR TURBOJET ENGINES
Filed Nov. 18, 1950     6 Sheets-Sheet 1

INVENTOR
RICHARD J. COAR

BY Jack N. McCarthy
AGENT

INVENTOR
RICHARD J. COAR
BY Jack N. McCarthy
AGENT

April 1, 1958 R. J. COAR 2,828,606
AFTERBURNER FUEL METERING DEVICE FOR TURBOJET ENGINES
Filed Nov. 18, 1950 6 Sheets-Sheet 6

INVENTOR
RICHARD J. COAR
BY Jack N. McCarthy
AGENT

United States Patent Office 2,828,606
Patented Apr. 1, 1958

2,828,606

AFTERBURNER FUEL METERING DEVICE FOR TURBOJET ENGINES

Richard J. Coar, Hartford, Conn., assignor to United Aircraft Corporation, East Hartford, Conn., a corporation of Delaware Application November 18, 1950, Serial No. 196,423

1 Claim. (Cl. 60—39.28)

This invention relates to a fuel meter and in particular to a fuel meter for use with a turbojet engine having an afterburner for metering fuel to the afterburner.

An object of this invention is to provide a fuel meter which will proportion fuel flow in accordance with one variable and vary said proportion in accordance with a second variable.

Another object of this invention is to provide an afterburner fuel meter which will proportion afterburner fuel flow in accordance with an engine operating variable and vary said proportion in accordance with an engine operating variable which varies as a function of afterburner fuel flow.

Further objects and advantages will be apparent from the following specification and drawing.

Figure 1:
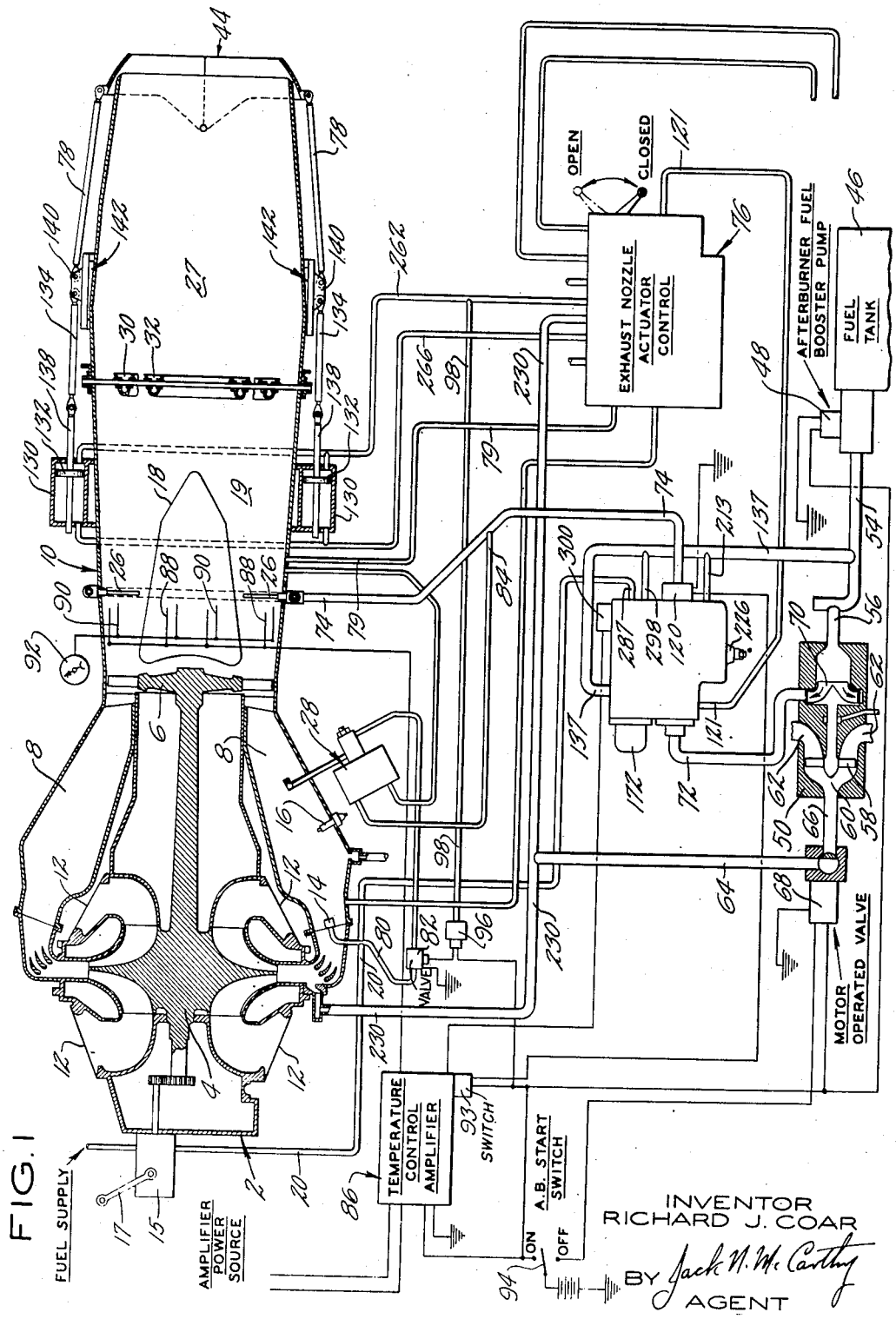
Fig. 1 is a schematic view of a turbojet engine having an afterburner showing the controls for the afterburner with a fuel meter.

The turbojet engine 2 has a compressor 4, which, in the arrangement shown, is a centrifugal type, driven by a turbine 6. Combustion chambers 8 therebetween deliver air from the compressor to the turbine. An afterburner 10 is attached at the turbine outlet to provide a means of increasing the thrust.

The engine 2 has two axially-spaced annular intake openings 12 to direct the incoming air into the two oppositely facing annular compressor inlets. Compressed air discharging from the compressor 4 passes to the turbine through the combustion chambers 8 where it is mixed with fuel from fuel nozzles 14. These fuel nozzles 14 receive fuel from the governor 15 through conduit 20. The fuel-air mixture is initially ignited within the combustion chambers 8 by a spark igniter 16. The governor 15 maintains the rotative speed of the turbine rotor assembly in accordance with the value selected by the power lever 17 by controlling fuel flow supplied through conduit 20 and nozzles 14 to the combustion chambers 8.

From the turbine, the gases pass around a cone 18 into the diffuser section 19 of the afterburner. When the afterburner is operating, fuel is discharged into these gases from a plurality of fuel nozzles 26 located radially in the diffuser 19. Since the gases leaving the turbine 6 contain considerable unburned oxygen, the additional fuel introduced by fuel nozzles 26 provide a combustible mixture which may be initially ignited within combustion chamber 27 by ignition means hereinafter described, which may be the type shown and claimed in the co-pending applications Serial No. 196,402 filed November 18, 1950, now Patent No. 2,780,055, issued February 5, 1957, and Serial No. 196,426 filed November 18, 1950. The burning of this combustible mixture is stablized in afterburner combustion chamber 27 by flameholders 30 and 32. The burned gases discharge from the engine through the nozzle 44 whose area can be varied.

The variable nozzle 44 operates between a minimum opening for engine operation without afterburning and a maximum opening for operation of the engine with afterburning. A nozzle and actuating system, similar to the one shown with this invention, is shown and claimed in co-pending application Serial No. 193,734 filed November 2, 1950, now Patent No. 2,714,285 issued August 2, 1955. The actuating system consists of the cylinder 130, piston 132, connecting control rod 134, nozzle control rod 78, piston rod 138, a car 140, and a track mechanism 142 for said car.

The afterburner control system can be divided into three main parts. They are the following: (1) the fuel system, (2) the ignition means and (3) the exhaust nozzle actuator control. These three parts are closely coordinated by fluid conduit connections and an electrical system.

The fuel system consists of the fuel tank 46, the fuel booster pump 48, the fuel pump 50, the fuel meter (see Figs. 2, 4 and 6) and the fuel nozzles 26. The fuel booster pump 48 is mounted on the fuel tank 46 and is connected to the fuel pump 50, by conduits 54 and 56. The fuel pump 50 is of the turbine type having a turbine rotor 58 mounted therein with an intake passage 60 and exhaust passages 62 for the working fluid. The working fluid, which is shown as compressed air supplied from the compressor outlet of the engine, is delivered to the intake passage 60 by conduits 230, 64 and 66. A motor operated valve 68 is located at the junction of conduits 64 and 66 to control the operation of the fuel pump by regulating the flow of compressed air to the pump. The turbine rotor 58 drives an impeller 70 which provides the pumping action. The fuel pump 50 delivers fuel to the fuel meter through conduit 72. The fuel meter meters the fuel therein and injects it into the engine through conduit 74 and nozzles 26.

Figure 2:
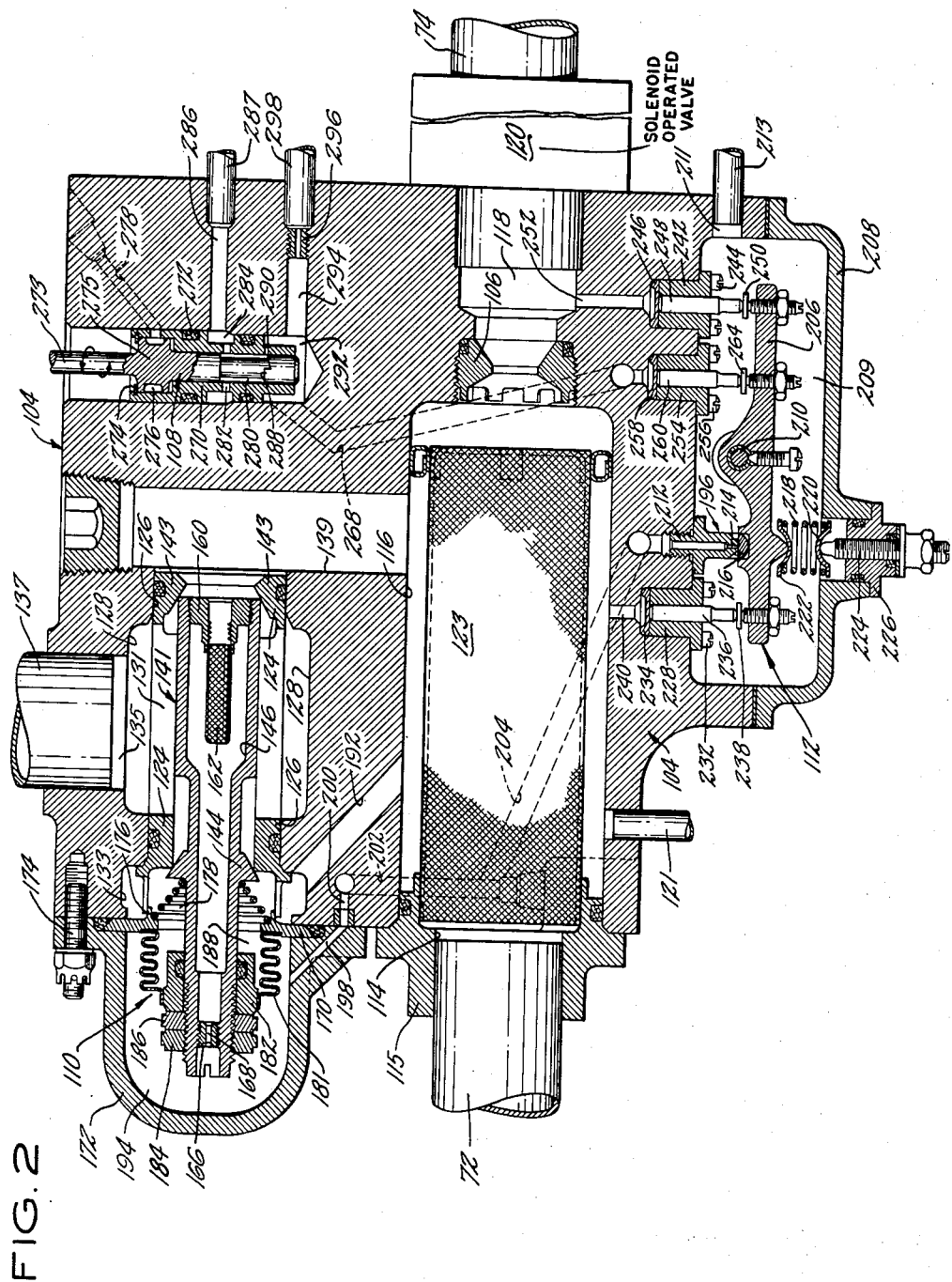
Fig. 2 is an enlarged view in cross-section of the fuel meter included in Fig. 1.
Figure 3:
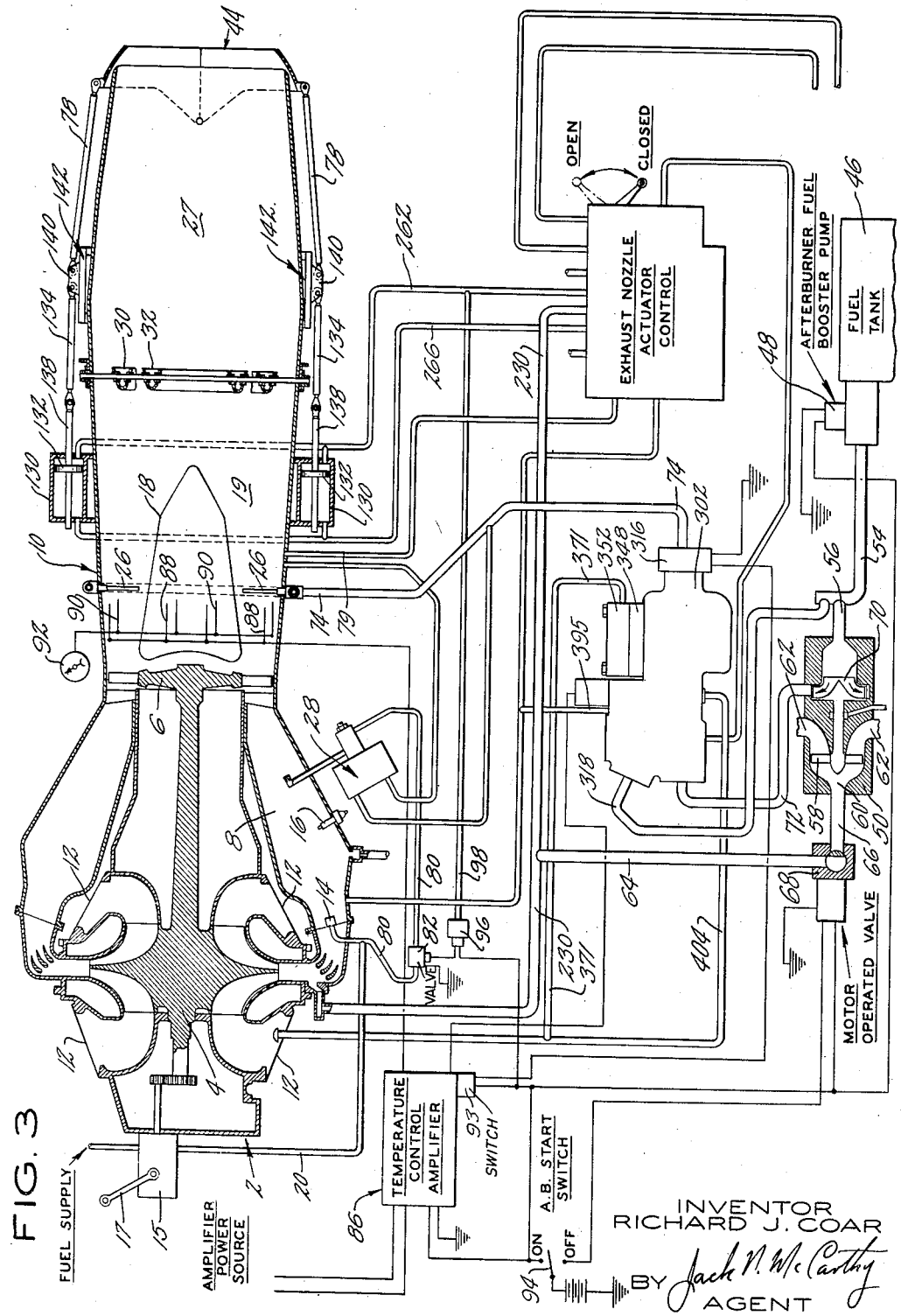
Fig. 3 is a schematic view of a turbojet engine having an afterburner showing the controls for the afterburner with a modification of a fuel meter.

The fuel meter in Fig. 2 proportions afterburner fuel flow to engine fuel flow and is a meter in which the afterburner fuel flow can be attenuated manually or automatically to control some engine performance variable such as turbine discharge temperature.

This fuel meter has a housing 104 which contains therein four main parts; a metering orifice 106, a valve assembly 108 for attenuating the measurement of engine fuel flow in accordance with turbine discharge temperature, a by-pass valve assembly 110, and a by-pass valve controlling mechanism 112. These parts are interconnected by passages and connected to other devices in the overall system to provide an operative structure. Afterburner fuel is admitted to housing 104 through an opening 114 in a cover 115 to a chamber 116 which is connected to a fuel outlet passage 118 by metering orifice 106. A normally closed solenoid operated valve 120 is located between passage 118 and conduit 74. A filter 123 may be provided in inlet chamber 116 to filter out any impurities in the fuel. Opening 121 provides a point at which a conduit may be connected to carry a working fluid to another device.

The by-pass valve assembly 110 has a sleeve 124 fixedly mounted in bore 126 of housing 104. An annular groove 128 located between the ends of the bore 126 communicates with the interior of the sleeve by slots 131. A second annular groove 133 is located at one end of bore 126. An opening 135 connects annular groove 128 to a by-pass fuel return conduit 137. Passages 139 and 192 connect the ends of the sleeve 124 with inlet chamber 116.

A by-pass valve 141 is slidably mounted in sleeve 124. The end of the valve 141 within the sleeve 124 seats against a conical flange 143 at one end of the sleeve 124, and a conical flange 144 on the valve 141 seats on the other end of the sleeve 124. The by-pass valve has a passage 146 therethrough connecting passage 139 to a chamber 194, hereinafter described. A bushing 166 with a restricting orifice 168 is provided in one end of passage 146 and a bushing 160 with a filter 162 is provided at the other end.

An annular ring 170 is held between the housing 104 and a cover 172 which is held on by bolts 174. The ring 170 has an annular flange 176 which forms a circular spring seat for a spring 178 which is located around valve 141 and has its other end seated against flange 144 thereby biasing valve 141 to a closed position.

A bellows 181 is fixed at one end to the inner diameter of annular ring 170 and at its other end to a washer member 182 which is mounted around one end of valve 141. Two nuts 184 and 186 position washer member 182 on valve 141. The interior of the bellows in combination with annular groove 133, valve 141, bushing 182, ring 170, and the end of sleeve 124, forms a chamber 188 which is connected to inlet chamber 116 by passage 192. The exterior of the bellows 181, cover 172, ring 170, washer member 182, and end of valve 141, form a chamber 194 which is connected to a valve 196 of the by-pass valve controlling mechanism 112 by passages 198, 200, 202, and 204.

The by-pass valve controlling mechanism 112 consists of a walking beam 206 having various forces applied to regulate valve 196. A cover 208 encloses this mechanism forming a chamber 209 which is connected to a low reference pressure by opening 211 and conduit 213. The walking beam is pivoted at 210. Valve 196 consists of a bushing 212 fixed in housing 104 having an orifice 214 therein and a flow regulating part 216 fixed on walking beam 206.

A spring 218 mounted between two spring retainers 220 and 222 is located under valve 196 to bias said valve to a closed position. An adjustable screw 224 is mounted in a bushing 226 fixed to cover 208 to movably position spring retainer 220.

A cylinder 228 is fixed to housing 104 by bolts 232 with a diaphragm 234 therebetween to prevent leakage. A passage 240 connects chamber 116 to one side of diaphragm 234. Fluid pressure in passage 240 is applied through diaphragm 234 to a piston 236, which is interposed between the diaphragm and an adjustable stop 238 on walking beam 206, to move the valve 196 to an open position. A second cylinder 242 is fixed to housing 104 by bolts 244 with a diaphragm 246 therebetween to prevent leakage. A passage 252 connects passage 118 to one side of diaphragm 246. Fluid pressure in passage 252 is applied through diaphragm 246 to a piston 248, which is interposed between the diaphragm and an adjustable stop 250 on walking beam 206, to move the valve 196 to a closed position. A third cylinder 254 is fixed to housing 104 by bolts 256 with a diaphragm 258 therebetween to prevent leakage. A passage 268 connects chamber 292, to be described later, to one side of diaphragm 258. Fluid pressure in passage 268 is applied through diaphragm 258 to a piston 260, which is interposed between the diaphragm and an adjustable stop 264 on walking beam 206, to move the valve 196 to a closed position.

The attenuating valve assembly 108 has a sleeve 270 which is fixed in bore 272 of housing 104. Snap ring 274 holds a valve 275 of the assembly in the sleeve. An annular groove 276 in the valve is connected to drain by passage 278. Valve 275 has an annular groove 280 which is connected by openings 282 to an annular groove 284 in sleeve 270, which is in turn connected to passage 286. Passage 286 is connected through conduit 287 and conduit 80 to engine fuel nozzle pressure. A contour 288 formed on the lower face of groove 280 cooperates with an orifice 290 to vary the opening presented through the orifice between two limits. This orifice enters into chamber 292 which is in turn connected by passage 268 to piston 260, and by passage 294, in which a restricting orifice 296 is mounted, to a reference fuel pressure conduit 298. Valve 275 is rotated by a shaft 273 to vary the restriction formed by contour 288 and orifice 290.

Figure 4:
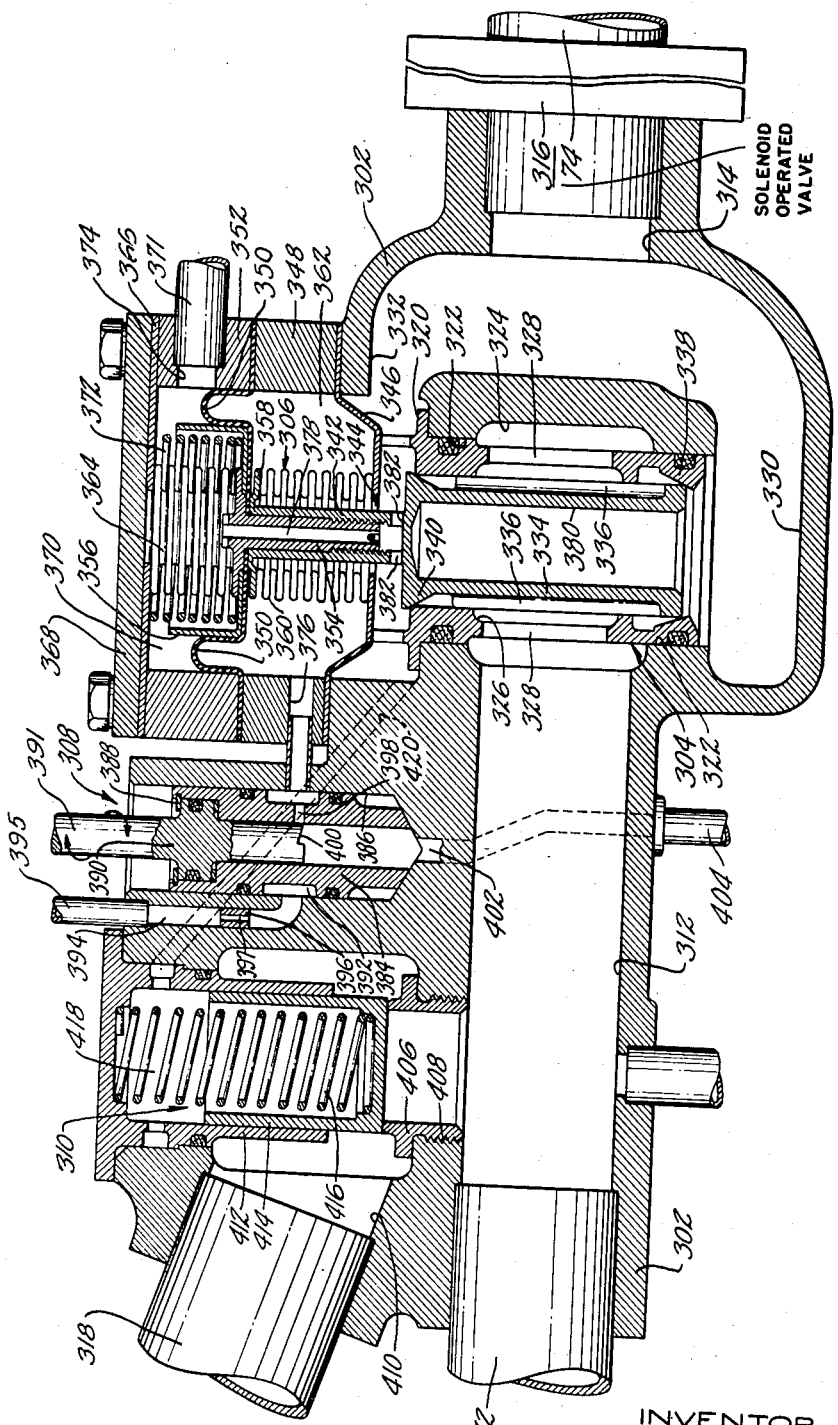
Fig. 4 is an enlarged view in cross-section of the modification of the fuel meter included in Fig. 3.
Figure 5:
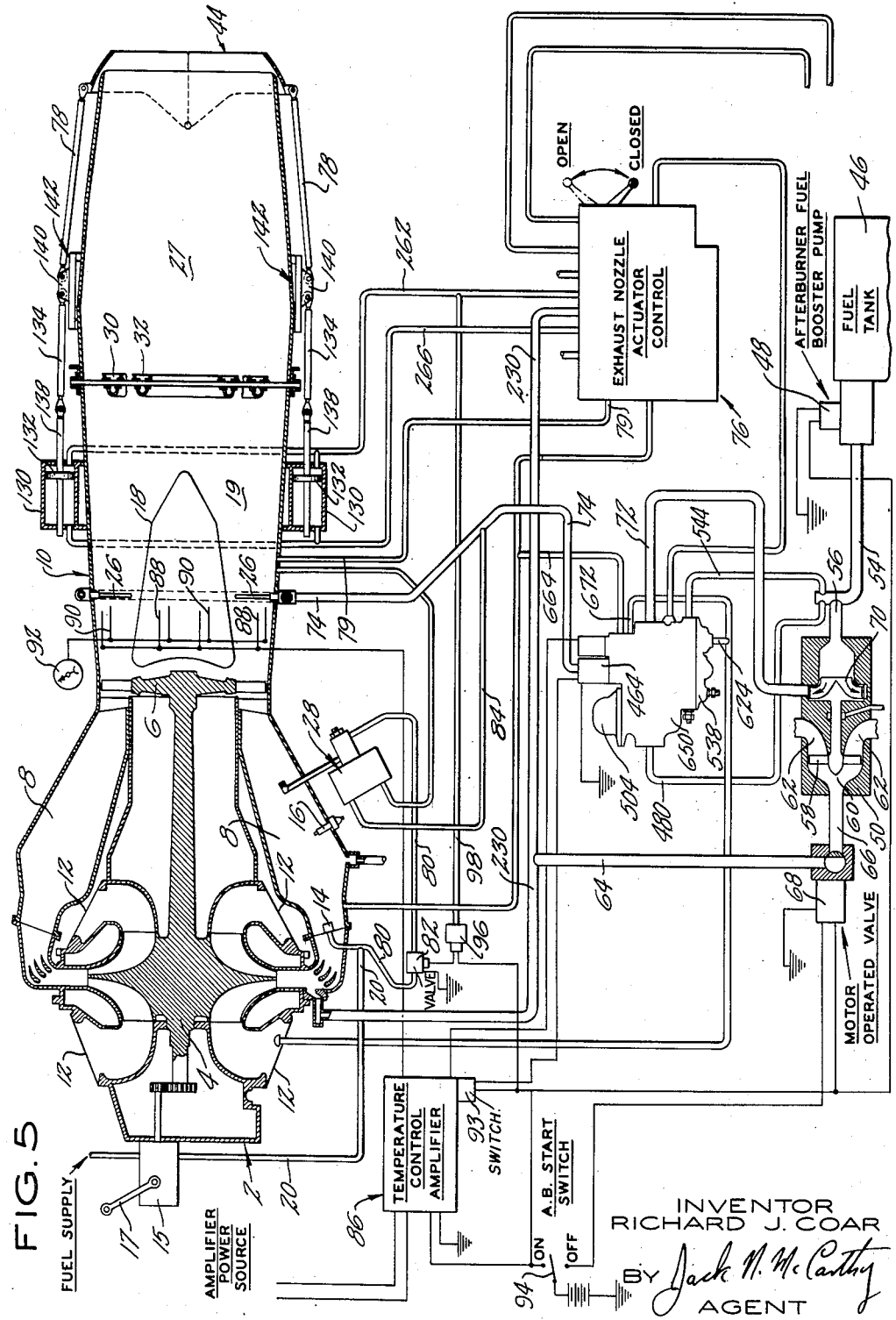
Fig. 5 is a schematic view of a turbojet engine having an afterburner showing the controls for the afterburner with another modification of a fuel meter.

The fuel meter in Fig. 4 meters fuel flow as a function of engine air flow and this fuel flow may be attenuated manually or automatically to control some engine performance variable such as turbine discharge temperature.

This fuel meter has a housing 302 which contains therein four main parts; a metering valve assembly 304, a metering valve controlling mechanism 306, a valve assembly 308 for attenuating the measurement of engine air flow in accordance with turbine discharge temperature, and a by-pass valve 310, these parts are interconnected by passages and connected to other devices in the overall system to provide an operative structure. Afterburner fuel is admitted to housing 302 through passage 312 to metering valve 304. It is then metered by the valve and passed out opening 314 to a shut-off valve 316. A by-pass valve 310 connects passage 312 to conduit 54 through conduit 318.

The metering valve assembly 304 has a sleeve 320 fixedly mounted in bore 322 of housing 302. An annular groove 324 located between the ends of the bore 322 communicates with an annular groove 326 on the interior of the sleeve by bolts 328. A passage 330 connects the bottom of sleeve 320 to opening 314 and passage 332 connects the top of the sleeve to opening 314.

A metering valve 334 is slidably mounted in sleeve 320 by ribs 336. The end of the valve in sleeve 320 seats against a contoured circular flange 338 at one end of the sleeve 320 and, a contoured circular flange 340 on the valve seats on the other end of the sleeve 320. A hollow stem 342 on the valve 334 extends upward through a hole 344 in a rigid disk 346, which is held between housing 302 and member 348, to be connected with the metering valve controlling mechanism.

The metering valve controlling mechanism 306 has a diaphragm 350 which is held at its outer edge between member 348 and member 352. Valve stem 342 is internally threaded and receives a hollow bolt member 354 which passes through a cup member 356, the center of diaphragm 350 and a washer 358 to hold these parts together.

A bellows 360 is connected at one end around valve stem 342 to washer 358 and at the other end to the edge of the hole 344 in rigid disk 346. A chamber 362 is formed between bellows 360, diaphragm 350, rigid disk 346 and member 348.

A second bellows 364 is attached at one end to the head of bolt 354 and at the other end to a plate 366 which is held between member 352 and cover 368. A chamber 370 is formed between bellows 364, diaphragm 350, plate 366 and member 352. A spring 372 is located around bellows 364 between plate 366 and cup 356 acting in a direction to close valve 334.

Chamber 370 is connected to conduit 371 by opening 374, and chamber 362 is connected to the attenuating valve assembly 308 by passage 376. The interior of bellows 364 is connected to the outlet side of valve assembly 304 by passage 378, which passes through bolt 354, hollow stem 342, and holes 382 in stem 342. The interior of bellows 360 is connected to the outlet side of valve assembly 304 by hole 344 in rigid disk 346.

The attenuating valve assembly 308 has a sleeve 384 which is fixed in bore 386 of housing 302. Snap ring 388 holds valve 390 of the assembly in sleeve 384. Sleeve 384 has an annular groove 392 which connects passage 394 which has a bushing 396 with an orifice 397 to passage 376. Passage 394 is connected through conduit 395 to compressor discharge pressure. An orifice 398 connects annular groove 392 to the center of sleeve 384. The lower end of valve 390 provides the valve action by a contour 400 thereon which varies the opening presented by orifice 398. The end of sleeve 384 is connected by passage 402 and conduit 404 to compressor inlet pressure. Valve 390 is rotated by a shaft 391 to vary the restriction formed by contour 400 and orifice 398.

A valve seat 406 is placed in opening 408 which connects passage 312 with the by-pass fuel outlet 410. A valve sleeve 412 is fixedly mounted in housing 302. By-pass valve 414 is slidably mounted in sleeve 412 being biased against seat 406 by a spring 416. The chamber 418 formed by valve 414 and sleeve 412 is connected to passage 332 by passage 420.

Figure 6:
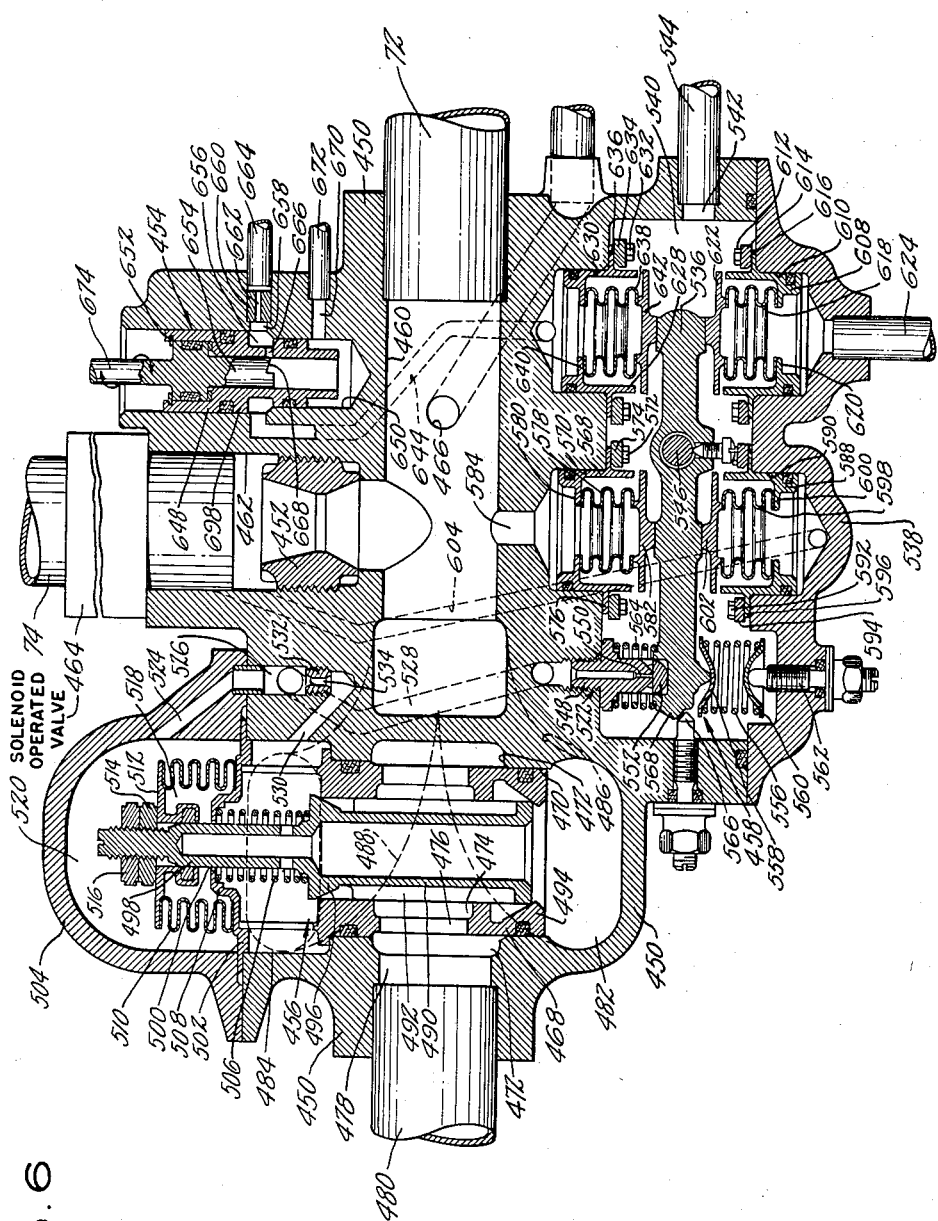
Fig. 6 is an enlarged view in cross-section of the fuel meter included in Fig. 5.

The fuel meter in Fig. 6 meters fuel flow as a function of engine air flow and this fuel flow may be attenuated manually or automatically to control some engine performance variable such as turbine discharge temperature.

This fuel meter has a housing 450 which contains therein four main parts: a metering orifice 452, a valve assembly 454 for attenuating the measurement of engine air flow in accordance with turbine discharge temperature, a by-pass valve assembly 456 and a by-pass valve controlling mechanism 458. These parts are interconnected by passages and connected to another device in the overall system to provide an operative structure. Afterburner fuel is admitted to housing 450 through passage 460 which is connected to a fuel outlet passage 462 by metering orifice 452. A normally closed solenoid operated valve 464 is located between passage 462 and conduit 74. Opening 466 provides a point at which a conduit may be connected to carry a working fluid to another device.

The by-pass valve assembly has a sleeve 468 fixedly mounted in bore 470 of housing 450. An annular groove 472 located between the ends of the bore 470 communicates with an annular groove 474 on the interior of the sleeve by slots 476. An opening 478 connects annular groove 472 to a by-pass fuel return conduit 480. A second annular groove 482 is located at one end of bore 470 and a third annular groove 484 is located at the other end of said bore. These annular grooves 482 and 484 are in communication with each end of the sleeve 468. A passage 486 connects annular groove 482 to passage 460 and passage 488 connects annular groove 484 to passage 460. A by-pass valve 490 is slidably mounted in sleeve 468 by ribs 492. The end of the valve within sleeve 468 seats against a circular flange 494 at one end of the sleeve and a circular flange 496 on the valve seats on the other end of the sleeve. A stem 498 on the valve 490 extends upward through a hole 500 in a rigid disk 502, which is held between housing 450 and cover member 504. A spring 506 mounted around stem 498 is seated at one end against a spring retaining cup 508 in rigid disk 502 and at its other end against flange 496 of valve 490, biasing said valve to a closed position.

A bellows 510 is fixed at one end to rigid disk 502 and at its other end to a washer member 512 which is mounted near the end of stem 498. Two nuts 514 and 516 position said washer member on the valve stem. The interior of the bellows forms a chamber 518 with washer member 512 and rigid disk 502. This chamber communicates with annular groove 484 through hole 500 in the rigid disk 502. The exterior of the bellows 510, rigid disk 502, washer member 512 and cover member 504 form a chamber 520 which is connected to valve 522 of the by-pass valve controlling mechanism 458 by passages 524, 526, and 528. Annular groove 484 is connected to passage 526 by passage 530 which has a bushing 532 with restricting orifice 534 therein.

The by-pass valve controlling mechanism 458 consists of a walking beam 536 having various forces applied to regulate valve 522. A cover 538 encloses this mechanism forming a chamber 540 which is connected to a lower reference pressure by opening 542 and conduit 544. The walking beam is pivoted at 546. Valve 522 consists of a bushing 548 fixed in housing 450 having an orifice 550 therein and a flow regulating part 552 fixed on walking beam 536.

A spring 556 mounted between two spring retainers 558 and 560 is located under valve 522 to bias said valve to a closed position. An adjustable screw 562 is mounted in cover 538 to movably position spring retainer 560. A spring 564 is mounted between the bushing 548 of valve 522 and walking beam 536 to bias said valve to an open position. An adjustable stop 566 is mounted in housing 450 and extends under a projection 568 on walking beam 536 to control the amount of movement of said walking beam.

A cylinder member 568 is fixed to housing 450 in a recess 570 by bolts 572 which pass through an annular ring 574 to clamp an outer extending flange 576 of said cylinder member against said housing. A bellows 578 is connected at one end to an inner circular flange 580 in the cylinder member and is connected at its other end to a disk 582 which is mounted on walking beam 536. The interior of bellows 578 is subjected to fuel inlet pressure from passage 460 by passage 584.

A second cylinder member 588 is fixed to cover 538 in a recess 590 by bolts 592 which pass through an annular ring 594 to clamp an outer extending flange 596 of said cylinder member against said cover. A bellows 598 is connected at one end to an inner circular flange 600 in the cylinder member and is connected at its other end to a disk 602 which is mounted on walking beam 536. The interior of bellows 598 is subjected to pressure from the fuel outlet 462 by passage 604.

A third cylinder member 608 is fixed to cover 538 in a recess 610 by bolts 612 which pass through an annular ring 614 to clamp an outer extending flange 616 of said cylinder member against said cover. A bellows 618 is connected at one end to an inner circular flange 620 in the cylinder member and is connected at its other end to a disk 622 which is mounted on walking beam 536. The interior of bellows 618 is subjected to compressor inlet pressure by conduit 624.

A fourth cylinder member 628 is fixed to housing 450 in a recess 630 by bolts 632 which pass through an annular ring 634 to clamp an outer extending flange 636 of said cylinder member against said housing. A bellows 638 is connected at one end to an inner circular flange 640 in the cylinder member and is connected at its other end to a disk 642 which is mounted on walking beam 536. The interior of bellows 638 is subjected to pressure from the attenuating valve assembly 454 by passage 644.

The attenuating valve assembly 454 has a sleeve 648 which is fixed in bore 650 of housing 450. Snap ring 652 holds valve 654 of the assembly in sleeve 648. Sleeve 648 has an annular groove 656 which connects passage 658 which has a bushing 660 with a restricting orifice 662 therein to passage 644. Passage 658 is connected to conduit 664. An orifice 666 connects annular groove 656 to the center of sleeve 648. The lower end of valve 654 provides valve action by a contour 668 thereon which varies the opening of orifice 666. The end of sleeve 648 is connected by passage 670 to a conduit 672. Valve 654 is rotated by a shaft 674 to vary the restriction formed by contour 668 and orifice 666. A fuel meter of this type is also shown and claimed in co-pending application Serial No. 196,414 filed November 18, 1950, now Patent No. 2,714,803, issued August 9, 1955.

The exhaust nozzle actuator control 76 is a device to divert a pressure to the exhaust nozzle actuating cylinders 130 either to open or to close the exhaust nozzle as required. Compressed air from the compressor 4 is delivered to the nozzle control 76 by conduit 230 to provide the operating pressure. Conduit 262 connects the nozzle control to the side of the cylinders 130 which causes the nozzle 44 to open when the operating pressure is applied and conduit 266 connects the nozzle control to the side of the cylinders 130 which causes the nozzle 44 to close when the operating pressure is applied. Turbine exhaust gas static pressure which is delivered to the control 76 by conduit 79 automatically actuates the nozzle control 76 to connect conduit 230 to either conduit 262 or 266. An exhaust nozzle actuator control of this type is shown and claimed in co-pending application Serial No. 196,424 filed November 18, 1950, now Patent No. 2,715,311, issued August 16, 1955.

The igniter control 28 injects an amount of fuel in addition to that normally supplied into combustion chamber 8 where it is ignited resulting in flame propagation through the turbine into the afterburner for igniting a combustible mixture in the afterburner. Fuel is provided to the igniter control 28 from the main fuel system by conduit 80 which has a solenoid actuated shut-off valve 82 connected therein. The igniter control is connected by conduit 84 to conduit 74 which provides the actuating pressure to inject the additional fuel to provide ignition in the afterburner.

The electrical system may include a temperature control amplifier 86 which during afterburner operation is sent a signal by thermocouples 88 which sense turbine discharge temperature. Thermocouples 90 also sense turbine temperature but send their signal to a temperature gage 92. This amplifier when energized sends a signal to motor 300 of the fuel meter to attenuate fuel flow in accordance with turbine discharge temperature and controls the operation of a normally closed solenoid operated shut-off valve in the fuel meter. When a predetermined turbine discharge temperature is reached, the motor 300 is operated to reduce the flow of fuel to the afterburner if such a reduction is possible; and when a higher temperature is permissible and an increased afterburner fuel flow is possible, the motor 300 is operated to increase the flow of fuel to the afterburner. In the event a temperature is reached in the afterburner above another predetermined temperature and remains after the fuel flow to the afterburner has been reduced by the movement of motor 300 the switch 93 will operate to permit the shut-off valve in the fuel meter to close off the fuel flow to the afterburner. The afterburner switch 94 controls the amplifier 86, sets the motor operated valve 68, controls the fuel booster pump 48, and controls the opening of normally closed solenoid actuated shut-off valve 82.

*Operation*

Afterburner operation is initiated by placing switch 94 in its "on" position. This movement turns the temperature control amplifier on which in turn opens a normally closed solenoid operated shut-off valve in the fuel meter and sends a signal to the afterburner fuel meter for attenuating fuel flow therethrough. This movement of the switch also places motor operated valve 68 in open position, starts the fuel booster pump 48 and opens normally closed solenoid actuated shut-off valve 82.

The operation of the fuel booster pump forces fuel from the fuel tank 46 through conduits 54 and 56 to the impeller 70 of the fuel pump 50. The opening of the motor operated valve 68 allows compressed air to be directed from the outlet of the engine compressor 4 through conduits 230, 64 and 66 against turbine 58 to drive the impeller 70. The impeller 70 then delivers fuel to the afterburner fuel meter.

Since both the fuel/air ratio required by the turbine for operation at the conditions where afterburning is used and the fuel/air ratio required in the afterburner are essentially constant, and since the gas flow through the turbine is equal to the gas flow into the afterburner, it follows that the afterburner fuel flow requirements may be approximately met by proportioning the afterburner fuel flow to the engine fuel flow. As will be evident from the following description, if the fuel meter of Fig. 2 is used, the afterburner fuel flow will be proportioned to engine fuel flow within desired limits, and this proportion may be more or less attenuated from a rich limit to a lean limit, manually or automatically, to finely control some engine operating parameter such as turbine discharge temperature.

Fuel supplied under pressure of impeller 70 flows into opening 114, through chamber 116, through orifice 106 into outlet passage 118 and passes by a normally closed solenoid actuated shut-off valve 120, which is now open, to conduit 74 and fuel nozzles 26. The fuel pressure differential across the orifice 106 is controlled by by-pass valve 141 which by-passes a portion of the fuel supplied by the pump 50. Since for any given operating condition the fuel flow supplied by the pump 50 to the meter is a particular value, when valve 141 bypasses more of this flow, there is less flow available to pass through the orifice 106. The by-pass valve, which is held closed by spring 178, is opened by reducing the fuel pressure in chamber 194, by virtue of the pressure differential thus applied across bellows 181. The fuel pressure in chamber 194 is provided through restricting orifice 168 which receives high-pressure fuel from chamber 116 through passages 139 and 146. The fuel pressure in chamber 194 is reduced by bleeding fluid through valve 196. When the valve 196 is closed, there is no flow through said valve or through restriction 168; therefore, the pressure in chamber 194 is the same as the pressure in chamber 188 and consequently by-pass valve 141 is held closed by spring 178.

When valve 196 is opened, the resultant flow of fuel past said valve, which is supplied through restricting orifice 168, reduces the pressure in chamber 194 so that the by-pass valve opens. The amount of bleeding which occurs through valve 196 is determined by the action of walking beam 206. The action of walking beam 206 is regulated by balance of the following pressures: unmetered fuel pressure from chamber 116 which works against piston 236, spring 218, metered fuel pressure from passage 118 which works against piston 248, and the pressure in chamber 292 which works against piston 260. Equilibrium is reached in this hydraulic amplifier when the torque applied to the walking beam 206 by the pressure differential across the metering orifice 106 equals the counter-torque applied to the walking beam by spring 218 and by the pressure in chamber 292.

A pressure difference to measure engine fuel flow is applied to the attenuating valve assembly 108 through conduits 287 and 298. The higher pressure of this fluid flow sense, which may be the fuel nozzle pressure as shown, is applied to conduit 287. The lower pressure, which may be a drain fuel pressure as shown, is applied to conduit 298. When the restricting area formed by contour 288 cooperating with orifice 290 is large relative to the area of restricting orifice 296, the pressure in chamber 292 approaches the high pressure of conduit 287. When the restricting area at orifice 290 is small relative to that of restricting orifice 296, the pressure in chamber 292 approaches the low pressure of conduit 298. By rotating valve 275 the pressure in chamber 292 may be attenuated more or less relative to the fuel flow indicating pressure in conduit 187. When valve 275 is rotated to reduce the area at orifice 290, or when the pressure in conduit 287 decreases with lesser turbine fuel flows, the resultant lower pressures in chamber 292 require lesser pressure differentials across orifice 106 to bring the walking beam 206 to equilibrium and the afterburner fuel flow is thus reduced. In a like manner an increase in the area of orifice 290 or an increase in pressure in conduit 287 reflecting an increase in turbine fuel flow will cause an increase in afterburner fuel flow. The valve 275 may be rotated manually, or by a suitable motor to vary the afterburner fuel flow within the limits established by the contour 288 and restricting orifice 296. These limits can be established so as to insure a combustible mixture in the afterburner, and a suitable regulating means may be used to vary the afterburner fuel flow and control some engine operating parameter to a desired value. As shown, amplifier 86 measures turbine discharge temperature by thermocouples 88 and varies afterburner fuel flow to control said temperature at a desired value. If this is to be done manually, one may look at gage 92 and move valve 275 manually until a desired temperature is reached.

Since the fuel/air ratio required by the afterburner is substantially constant, and since the gas flow through the engine is for all practical purposes a unique function of the pressure rise across the compressor, it follows that the afterburner fuel flow requirements may be approximately met by metering the fuel flow as some function of compressor pressure rise. As will be evident from the following description, if the fuel meter in Fig. 4 is used, the afterburner fuel will be proportioned as a function of compressor rise within desired limits, and this proportion may be more or less attenuated from a rich limit to a lean limit, manually or automatically, to finely control some engine operating parameter such as turbine discharge temperature.

Fuel supplied under pressure of impeller 70 flows into pipe 312, through the balanced metering valve 334, through opening 314 and by a normally closed solenoid operated shut-off valve 316, which is now open, to conduit 74 and fuel nozzles 26. The pressure drop across the metering valve 334 is controlled by the by-pass valve 414. The metering valve 334 is a contoured valve so that the axial displacement of the valve effects a predetermined change in the area through which the afterburner fuel must flow. For any given operating condition the fuel flow supplied by the pump 50 to the meter is a particular value, and the by-pass valve 414 maintains constant the pressure drop across the metering valve. When the metering valve 334 opens or closes, it changes the flow passing by said valve.

The bellows shown are equal in effective area and form a seal between the fuel surrounding the valve and the air pressures which are applied to the diaphragm 350. Chamber 370 is connected by conduit 371 to compressor inlet pressure and chamber 362 is connected by passage 376 to compressor discharge pressure or a portion thereof as attenuated by valve 390.

It can be seen that the pressure differential applied across the diaphragm 350, the attenuated compressor discharge pressure minus compressor inlet pressure, is a particular proportion of the pressure rise across the compressor for the effective open area of orifice 398 fixed by contour 400 of valve 390. For a given effective open area of orifice 398, as the engine air flow increases the pressure rise across the compressor also increases and is applied against diaphragm 350 to urge valve 334 in an open direction against spring 372. In a like manner, as engine air flow decreases the pressure rise across the compressor also decreases and is applied against diaphragm 350 permitting the spring 372 to move valve 334 in closed direction. Then valve 334 assumes a position according to engine air flow and this position in accordance with the contouring of valve 334 results in the proper afterburner fuel flow.

A pressure difference to measure engine air flow is applied to the attenuating valve assembly 308 through conduits 395 and 404. The higher pressure of this air flow sense, which may be the compressor discharge pressure as shown, is applied to conduit 395. The lower pressure, which may be compressor inlet pressure as shown, is applied to conduit 404. When the restricting area formed by contour 400 cooperating with orifice 398 is large relative to the area of restriction 397, the pressure in chamber 362 approaches the low pressure of conduit 404. When the restricting area at orifice 398 is small relative to that of restriction 397, the pressure in chamber 362 approaches the high pressure of conduit 395. By rotating the valve 390 the pressure in chamber 362 may be attenuated more or less relative to the air flow indicating pressure in conduit 395. When valve 390 is rotated to reduce the area at orifice 398, the resultant higher pressures in chamber 362 urge valve 334 in an open direction against spring 372. In a like manner an increase in the area of orifice 398 will cause a reduction in afterburner fuel flow by permitting valve 334 to move in a closed direction.

The valve 390 may be rotated manually, or by a suitable motor, to vary the afterburner fuel flow within limits established by the contour 400 and orifice 398. These limits can be established so as to insure a combustible mixture in the afterburner, and a suitable regulating means may be used to vary the afterburner fuel flow and control some engine operating parameter to a desired value. As mentioned in the operation of the fuel meter shown in Fig. 2, amplifier 86 along with thermocouples 88 provide a suitable regulating means, and if the valve is to be rotated manually a gage 92 is provided with which to read the temperature at any desired point in the engine.

As will be evident from the following description, if the fuel meter in Fig. 6 is used, the afterburner fuel will be proportioned as a function of compressor rise within desired limits, and this proportion may be more or less attenuated from the rich limit to the lean limit, manually or automatically, to finely control some engine operating parameter such as turbine discharge temperature.

Fuel supplied under pressure of impeller 70 flows into passage 460, through orifice 452 into outlet passage 462 and passes by a normally closed solenoid actuated shut-off valve 464, which is now open, to conduit 74 and fuel nozzles 26. The fuel pressure differential across the orifice 452 is controlled by by-pass valve 490 which by-passes a portion of the fuel supplied by the pump 50. Since for any given operating condition the fuel flow supplied by the pump 50 is a particular value, when valve 490 by-passes more of this fuel, there is less flow available to pass through the orifice 452. The by-pass valve which is held closed by spring 506 is opened by reducing the fuel pressure in chamber 520, by virtue of the pressure differential thus applied across bellows 510. The fuel pressure in chamber 520 is provided through restricting orifice 534 which receives high pressure fuel from annular groove 484 through passages 530, 526, and 524. Chamber 518 receives high pressure fuel from annular groove 484 through hole 500 in rigid disk 502. The fuel pressure in chamber 520 is reduced by bleeding the fluid through valve 522. When valve 522 is closed, there is no flow through said valve or through restriction 534; therefore the pressure in chamber 520 is the same as the pressure in chamber 518 and consequently by-pass valve 490 is held closed by spring 506.

When valve 522 is open, the resultant flow of fuel past said valve, which is supplied through restricting orifice 534, reduces the pressure in chamber 520 so that the by-pass valve opens. The amount of bleeding which occurs through valve 522 is determined by the action of walking beam 536. The action of walking beam 536 is regulated by balance of the following pressures: spring 564, unmetered fuel pressure from passage 460 which is applied to bellows 578, the pressure in annular groove 656 which is applied to bellows 638, spring 556, metered fuel pressure from passage 462 which is applied to bellows 598, and the pressure which is applied to bellows 618. Equilibrium is reached in this hydraulic amplifier when the torque applied to the walking beam 536 by the pressure differential across the metering orifice 452 and by spring 564 equal the countertorque applied to the walking beam by the pressure differential between the pressure in bellows 638 and the pressure in bellows 618 and by spring 556.

To measure engine air flow, the difference in pressures of two stations in the gas flow path of the engine is applied to the attenuating valve assembly 454 through conduits 664 and 672. The higher pressure of this air flow sense, which may be compressor discharge pressure as shown, is applied to conduit 664. The lower pressure, which may be compressor inlet pressure as shown, is applied to conduit 672, and is also applied to bellows 618 by conduit 624. When the restricting area formed by contour 668 cooperating with orifice 666 is large relative to the area of restriction 662, the pressure in bellows 638 approaches the low pressure of conduit 672. When the restricting area at orifice 666 is small relative to that of restriction 662, the pressure in bellows 638 approaches the high pressure of conduit 664. By rotating the valve 654 the pressure in bellows 638 is thus attenuated more or less relative to the air flow indicating pressure in conduit 664. When valve 654 is rotated to reduce the area at orifice 666, or when the pressure difference between conduit 664 and the conduits 672 and 624 increases with greater engine air flows, the resultant increase in difference between the pressure in bellows 638 and the pressure in bellows 618 requires higher pressure differentials across orifice 452 to bring the walking beam 536 to equilibrium, thereby increasing the afterburner fuel flow. In a like manner an increase in the area of orifice 666, or a decrease in the pressure difference between conduit 664 and the conduits 672 and 624 reflecting a lesser engine air flow, will cause a decrease in afterburner fuel flow.

The valve 654 may be rotated manually, or by automatic means, to vary the afterburner fuel flow within limits established by the contour 668 and orifice 666 as mentioned in the operation of the fuel meter shown in Fig. 2 and Fig. 4.

The opening of the normally closed solenoid actuated shut-off valve 82 permits a source of fuel to be supplied to the igniter control 28 through conduit 80. The pressure of the fuel in conduit 74 is transferred to the igniter by conduit 84 which pressure permits fuel which has passed normally closed solenoid actuated shut-off valve 82 to be injected from the igniter control into a combustion chamber 8. Ignition of the injected fuel results in flame propagation through the turbine to the tail pipe resulting in ignition in the afterburner of the fuel being introduced through nozzles 26.

The ignition of fuel within the afterburner results in an increase in turbine exhaust gas pressure above that normally obtained without afterburning. This increase in pressure is transmitted to the exhaust nozzle actuator control through conduit 79. The control 76 in accordance with this pressure directs compressor discharge air from conduit 230 through conduit 262 to the side of the cylinders nearest the nozzle which causes nozzle 44 to open. The pressure in this conduit 262 is transmitted by conduit 98 to a normally closed pressure switch 96 in the electrical line to the normally closed solenoid actuated shut-off valve 82 which opens said switch thereby closing the shut-off valve 82 preventing a flow of fuel to the igniter control 28.

To cease operation of the afterburner the afterburner switch 94 is turned to its "off" position. This turns the temperature control amplifier 86 off thereby turning off a supply of current to the normally closed solenoid operated shut-off valve in the fuel meter and the normally closed solenoid actuated shut-off valve 82 in conduit 80. The movement of the switch to the "off" position also closes the motor operated valve 68 and turns off the afterburner fuel booster pump 48. It will be seen that with no fuel flow, combustion cannot be maintained in the afterburner. This decrease in afterburner pressure is transmitted to the exhaust nozzle actuator control thereby directing compressed air through conduit 266 from conduit 230 to the side of the cylinder 130 farthest from the nozzle which causes nozzle 44 to close. The reduction of pressure in conduit 262 is conveyed to normally closed pressure switch 96 by conduit 98 thereby permitting the switch to be closed to permit current to pass to valve 82 upon the next starting of the afterburner.

Although specific fuel meters have been shown and described herein for purpose of illustration, it will be evident to those skilled in the art that the invention is capable of various other modifications and adaptations within the scope of the appended claim. The control system for an afterburner as shown in this application is shown and claimed in co-pending application Serial No. 196,425 filed November 18, 1950, now Patent No. 2,780,054, issued February 5, 1957.

I claim:

A fuel meter having in combination a housing, an inlet passage, a metering orifice, an outlet passage, a by-pass valve connected to said inlet passage, flexible means in said housing forming two chambers, said by-pass valve being connected to said flexible means, each chamber being connected to said inlet passage, spring means biasing said by-pass valve to a closed position, a restriction in the connection to one chamber, first means responsive to an engine operating variable for operating said by-pass valve, said first means also being responsive to the pressure drop across said orifice, and means responsive to an engine operating variable for attenuating the effect of the first engine operating variable, said first means including a lever and a valve, said valve operating to open said chamber having a restriction in its connection to bleed.

References Cited in the file of this patent

UNITED STATES PATENTS

| | | |
|---|---|---|
| 2,095,991 | Lysholm | Oct. 19, 1937 |
| 2,422,808 | Stokes | June 24, 1947 |
| 2,441,948 | Atkinson | May 25, 1948 |
| 2,457,595 | Orr | Dec. 28, 1948 |
| 2,498,939 | Bobier | Feb. 28, 1950 |
| 2,564,107 | Holley | Aug. 14, 1951 |
| 2,566,373 | Redding | Sept. 4, 1951 |
| 2,570,591 | Price | Oct. 9, 1951 |
| 2,638,992 | Lundquist et al. | May 19, 1953 |
| 2,640,316 | Neal | June 2, 1953 |
| 2,667,743 | Lee | Feb. 2, 1954 |
| 2,668,416 | Lee | Feb. 9, 1954 |
| 2,675,674 | Lee | Apr. 20, 1954 |
| 2,688,841 | Decher et al. | Sept. 14, 1954 |
| 2,700,275 | Chandler et al. | Jan. 25, 1955 |
| 2,737,015 | Wright | Mar. 6, 1956 |

FOREIGN PATENTS

| | | |
|---|---|---|
| 576,243 | Great Britain | Mar. 26, 1946 |
| 941,556 | France | July 19, 1948 |